(12) United States Patent
Bernstein

(10) Patent No.: US 11,232,472 B2
(45) Date of Patent: *Jan. 25, 2022

(54) BUSINESS TO BUSINESS MARKETING SYSTEM

(71) Applicant: ELECTRONIC CREDIT SYSTEMS CORPORATION, Highland Park, IL (US)

(72) Inventor: Robert Bernstein, Highland Park, IL (US)

(73) Assignee: Electronic Credit Systems Corporation, Highland Park, IL (US)

( * ) Notice: Subject to any disclaimer, the term of this patent is extended or adjusted under 35 U.S.C. 154(b) by 140 days.

This patent is subject to a terminal disclaimer.

(21) Appl. No.: 16/660,423

(22) Filed: Oct. 22, 2019

(65) Prior Publication Data
US 2020/0051106 A1 Feb. 13, 2020

Related U.S. Application Data

(63) Continuation-in-part of application No. 12/042,921, filed on Mar. 5, 2008, now Pat. No. 10,489,794.

(60) Provisional application No. 60/904,960, filed on Mar. 5, 2007.

(51) Int. Cl.
*G06Q 30/00* (2012.01)
*G06Q 30/02* (2012.01)

(52) U.S. Cl.
CPC ..... *G06Q 30/0214* (2013.01); *G06Q 30/0236* (2013.01); *G06Q 30/0238* (2013.01)

(58) Field of Classification Search
None
See application file for complete search history.

(56) References Cited

U.S. PATENT DOCUMENTS

| 6,014,634 | A | * | 1/2000 | Scroggie | G06Q 20/12 |
| | | | | | 705/14.25 |
| 6,029,141 | A | | 2/2000 | Bezos et al. | |
| 8,271,326 | B1 | * | 9/2012 | Brunet | G06Q 30/0214 |
| | | | | | 705/14.16 |
| 2002/0049968 | A1 | * | 4/2002 | Wilson | H04H 60/65 |
| | | | | | 725/35 |
| 2002/0072974 | A1 | | 6/2002 | Pugliese, III et al. | |

(Continued)

*Primary Examiner* — Meredith A Long
(74) *Attorney, Agent, or Firm* — The Small Patent Law Group LLC; Philip S. Hof

(57) ABSTRACT

A system includes one or more processors configured to receive a unique customer identifier that is generated by a computer of a referring vendor. The unique customer identifier associates a customer with a product purchased by the customer and covered by a referral agreement. The one or more processors distribute promotional material of a referral receiving vendor to the customer associated with the unique customer identifier. The promotional material incorporates the unique customer identifier. The system includes a computer of the referral receiving vendor that receives one or both of the promotional material or the unique customer identifier from the customer at a point of sale with the referral receiving vendor. Upon validating the unique customer identifier, the computer of the referral receiving vendor is configured to discount a purchase price of one or more items according to a predetermined discount rate in the promotional material.

20 Claims, 2 Drawing Sheets

(56) References Cited

U.S. PATENT DOCUMENTS

| | | | |
|---|---|---|---|
| 2002/0107730 A1* | 8/2002 | Bernstein | G06Q 30/0268 705/14.38 |
| 2002/0120496 A1* | 8/2002 | Scroggie | G06Q 30/0236 705/14.25 |
| 2002/0123926 A1* | 9/2002 | Bushold | G06Q 30/0226 705/14.19 |
| 2002/0123930 A1* | 9/2002 | Boyd | G06Q 30/0244 705/14.13 |
| 2003/0115782 A1 | 6/2003 | Baker | |
| 2006/0282310 A1* | 12/2006 | Burch | G06Q 30/0214 705/14.16 |
| 2007/0016472 A1* | 1/2007 | Reznik | G06Q 30/0222 705/14.23 |
| 2007/0043583 A1 | 2/2007 | Davulcu et al. | |
| 2017/0140174 A1* | 5/2017 | Lacey | G06F 21/6245 |
| 2020/0076813 A1* | 3/2020 | Felice-Steele | G06F 9/54 |

\* cited by examiner

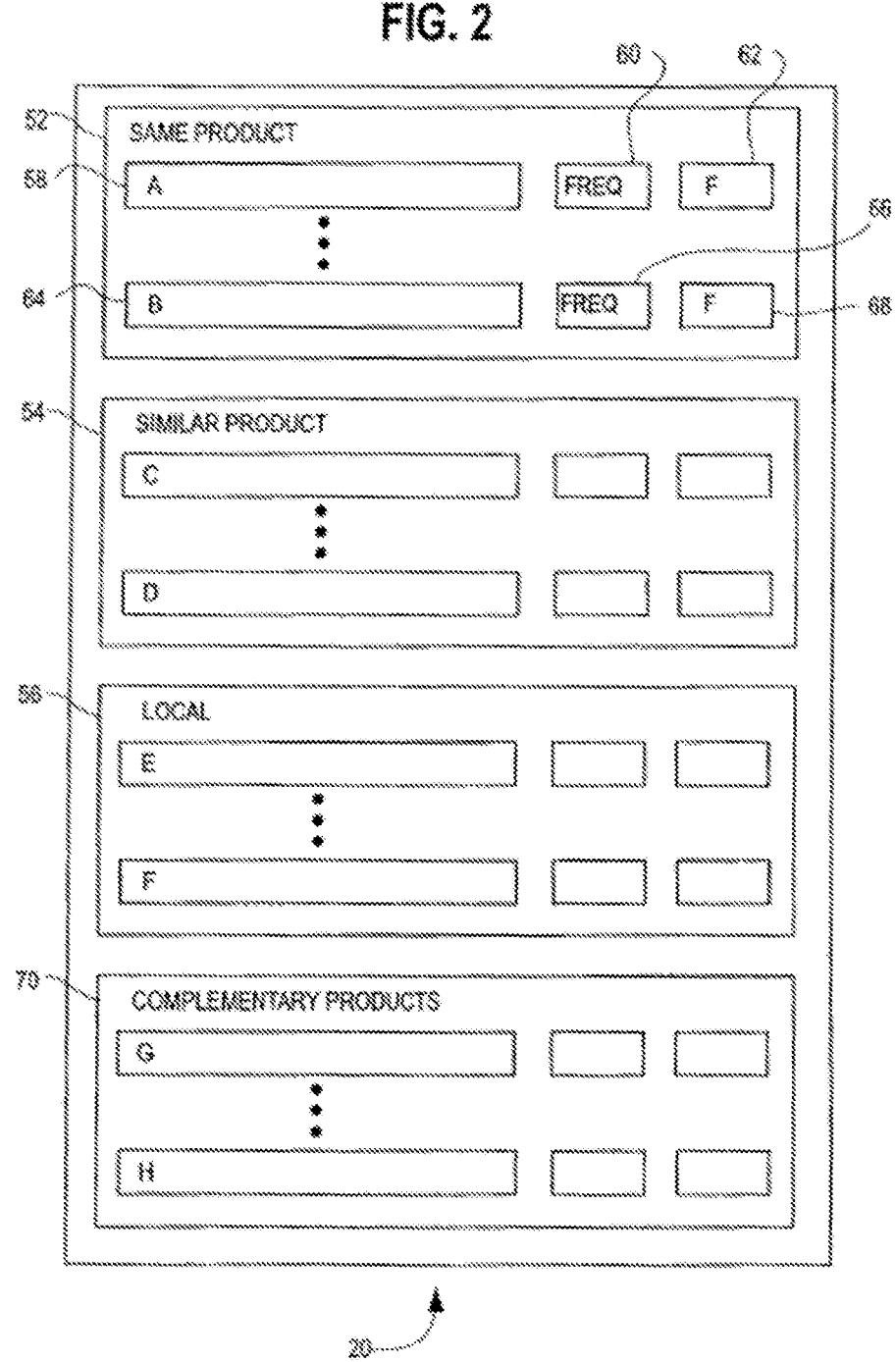

BUSINESS TO BUSINESS MARKETING SYSTEM

CROSS-REFERENCE TO RELATED APPLICATIONS

This application is a continuation-in-part of U.S. Non-Provisional application Ser. No. 12/042,921, filed Mar. 5, 2008, which claims the benefit of U.S. Provisional Application 60/904,960 filed Mar. 5, 2007, and the entire disclosure of which is incorporated by reference herein.

FIELD

The embodiments disclosed herein relate to computerized systems for identifying customers and distributing promotional materials to the identified customers.

BACKGROUND

In advertising, advertisers are known to target a particular type of buyer and then search for a communication medium most likely to reach the targeted buyer. For example, upscale buyers may preferentially subscribe to particular magazines or listen to one particular radio station over others. By identifying a particular medium, the advertiser may be able to tailor an ad to have a maximum impact on the targeted buyer. While such practices are effective, they are far from perfect. Mediums such as magazines are typically distributed nationally, yet many retailers only sell locally.

Other local mediums, such as radio or television, typically tailor their content to the broadest possible audience, thereby limiting an advertiser's ability to target a particular type of buyer. Further, the availability of streaming audio (or video) over the Internet virtually eliminate any regional limitations to radio or television broadcasting. In addition, the use of the Internet for marketing has further increased the difficulty of targeting potential buyers for the distribution of advertising materials. The right to privacy further complicates the unrestricted distribution of buyer information to vendors.

While the distribution of advertising materials under the prior art is effective, it is extremely inefficient. Because of the constant drone of commercial messages on radio and TV, many consumers simply tune out all ads. Accordingly, a need exists for a better method of identifying potential buyers and distributing promotional materials to the potential buyers.

SUMMARY

In one or more embodiments, a system is provided that includes one or more processors and a computer of a referral receiving vendor. The one or more processors are configured to receive a unique customer identifier that is generated by a computer of a referring vendor. The unique customer identifier associates a customer with a product purchased by the customer from the referring vendor and covered by a referral agreement between the referring vendor and the referral receiving vendor. The one or more processors are configured to distribute promotional material of the referral receiving vendor to the customer that is associated with the unique customer identifier. The promotional material of the referral receiving vendor incorporates the unique customer identifier generated by the computer of the referring vendor. The computer of the referral receiving vendor is configured to receive one or both of the promotional material or the unique customer identifier from the customer at a point of sale while the customer purchases one or more items affiliated with the promotional material from the referral receiving vendor. Upon validating the unique customer identifier, the computer of the referral receiving vendor is configured to discount a purchase price of the one or more items affiliated with the promotional material at the point of sale according to a predetermined discount rate in the promotional material.

In one or more embodiments, a method is provided that includes receiving, at one or more processors, a unique customer identifier that is generated by a computer of a referring vendor. The unique customer identifier associates a customer with a product purchased by the customer from the referring vendor and covered by a referral agreement between the referring vendor and a referral receiving vendor. The method includes distributing, by the one or more processors, promotional material of the referral receiving vendor to the customer that is associated with the unique customer identifier. The promotional material that is distributed incorporates the unique customer identifier generated by the computer of the referring vendor. Responsive to receiving, at a computer of the referral receiving vendor, the unique customer identifier from the customer at a point of sale while the customer purchases one or more items affiliated with the promotional material from the referral receiving vendor, the method includes validating the unique customer identifier and discounting a purchase price of the one or more items affiliated with the promotional material at the point of sale according to a predetermined discount rate in the promotional material.

In one or more embodiments, a system is provided that includes a gateway system and one or more processors at a third-party database. The gateway system is configured to filter details of plural transactions of a customer based on user-selected preferences by the customer and to compile a list of permitted transaction details to communicate. The gateway system is configured to communicate at least some of the permitted transaction details in the list. The permitted transaction details that are communicated include a unique customer identifier that is generated by a computer of a referring vendor. The unique customer identifier associates the customer with a product purchased by the customer from the referring vendor and covered by a referral agreement between the referring vendor and a referral receiving vendor. The one or more processors at the third-party database are configured to receive the permitted transaction details communicated by the gateway system and to distribute promotional material of the referral receiving vendor to the customer that is associated with the unique customer identifier based on the permitted transaction details. The promotional material of the referral receiving vendor incorporates the unique customer identifier generated by the computer of the referring vendor.

BRIEF DESCRIPTION OF THE DRAWINGS

FIG. 2 depicts a customer profile that may be used by the system of FIG. 1.

DETAILED DESCRIPTION

Figure 1:
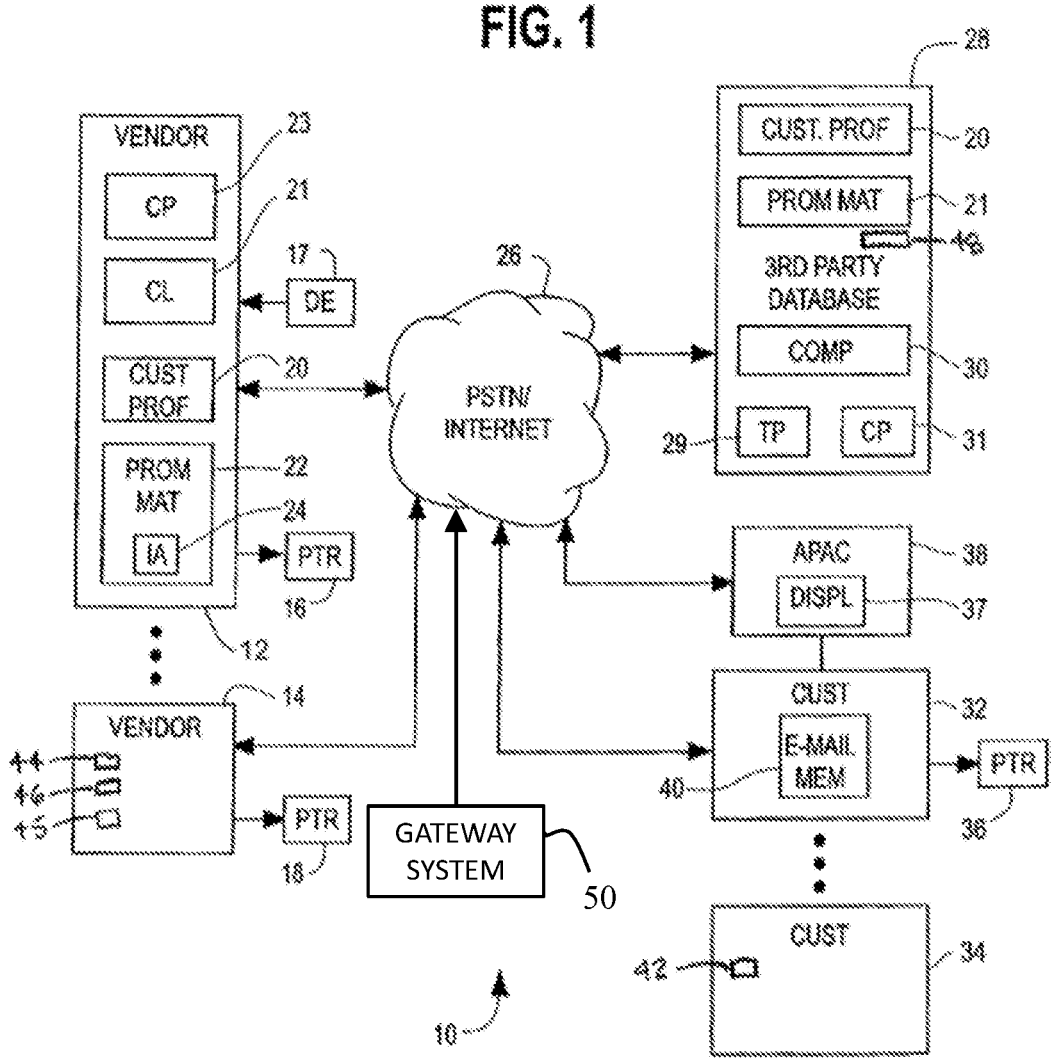
FIG. 1 is a block diagram of a system for distributing promotional materials in accordance with an illustrated embodiment of the invention.

FIG. 1 is a block diagram of a system 10 which allows vendors 12, 14 to identify potential customers 32, 34, shown generally in accordance with illustrated embodiments of the invention. While FIG. 1 shows two vendors 12, 14 and two customers 32, 34, it is to be understood that any number of vendors 12, 14 and any number of customers 32, 34 may be serviced by the system 10. Further, there is no limitation on geographic location. The only limitation under one preferred embodiment is that the vendor 12, 14 and the customer 32, 34 have access to the public switched telephone network (PSTN)/Internet and a relationship with a third-party database 28.

The system 10 according to one or more embodiments includes a third-party database 28 independent of both vendors 12, 14. Interactions between the vendors 12, 14 and the customers 32, 34 are detected and tracked through the use of proprietary software within the third-party database 28 and/or other components of the system 10. The third-party database 28 includes one or more processors located remote from the vendors 12, 14. For example, the third-part database 28 may represent a portion of a server, a computer, or the like, which is communicatively connected to respective computers at the vendors 12, 14 via wired and/or wireless communication links within one or more networks, such as the Internet 26, a local area network (LAN), and/or the like.

The system 10 allows vendors 12, 14 and customers 32, 34 to interact at any chosen level. Interactions may occur based upon a targeted locale, interest, or under any other chosen criteria.

The third-party database 28 may track financial transactions of buyers 32, 34, accept customer search profiles from vendors 12, 14, and/or the like. The third-party database may include or represent the third-party payment scheduler described in U.S. Pat. No. 6,298,335, which is incorporated by reference herein.

Under the illustrated embodiment, a customer (i.e., a buyer) 32, 34 may periodically interact with vendors 12, 14 directly, by face-to-face contact, or through the PSTN/Internet 26. Where the contact is face-to-face, payment may be made from the customer 32, 34 to the vendor 12, 14 for goods and services using the automatic portable account controller (APAC) 38 (e.g., a smartcard or the interactive device described in U.S. Pat. No. 5,591,949). Alternatively, the contact may be by telephone or through the Internet 26. In either case, a summary of the transaction may be generated and stored in a database of the vendor 32, 34 or the third-party database 28.

Based upon the interactions between the customers 32, 34, and at least some of the vendors 12, 14, the third-party database 28 may accumulate information regarding the buying preferences and habits of the individual customers 32, 34. Alternatively, the customers 32, 34 may request and complete a questionnaire of preferences and buying habits, which, in turn, may form a portion of the information within the third-party database 28.

From time to time, a vendor 12, 14 (e.g., 12) may desire to expand its customer base by distributing promotional materials (e.g., coupons, special price lists, catalogs, etc.) to potential customers 32, 34. In order to identify potential customers, the vendor 12 may form a customer profile 20. The vendor may form a customer profile using a data entry device 17 (e.g., a keyboard and display). Alternatively, a CPU functioning as a customer profiler 23 may analyze past sales to form a profile of customers which are likely to patronize the vendor 12.

The customer profile 20 may incorporate any of a number of limitations specific to the type of customer 32, 34. For example, if the vendor 12 markets locally, then the profile 20 may include a limitation that identified customers 32, 34 that live in or have a history of purchasing in the locale where the vendor 12 sells. Further, the vendor 12 may include limitations that identified customers 32, 34 have previously purchased complementary products or services in the locale where the vendor 12 sells. For example, if a customer likes pizza, then a complementary product may be beer. Alternatively, if a customer 32, 34 purchases gas at a particular location, then complementary products may be convenience products offered through a convenience store in the area.

FIG. 2 provides a summary of a customer profile 20. Included within the customer profile 20 may be limitations including purchases of the same products 52, similar products 54 or a locale of purchases 56. Each limitation may include a minimum frequency of purchase 60, 66 or even a dollar value 62, 68.

Upon forming the customer profile 20, the vendor 12 may transfer the profile 20 to the third-party database 28. Within the third-party database 28, a comparator 30 may function to compare the profile 20 to the buying habits and other information of any of a number of customers 32, 34. The third-party database 28 may return a customer list 21 of the customers 32, 34 with the closest match to the requesting vendor 12.

In order to preserve the privacy of the customers 32, 34, the third-party database 28 may release customer information to the vendor 12 in summary form only. For example, the third-party database 28 may limit the release to contact information about identified customers 32, 34 which meet the limitations of the customer profile 20. The contact information (i.e., customer list 21) may be downloaded to the vendor 12.

Alternatively, customer privacy may be protected by uploading the promotional material 22 from the vendor 12 to the third-party database 28. The third-party database 28, in turn, may function to distribute the promotional material.

In either case, a communication processor 31 within the third-party database 28 or vendor 12 may distribute the promotional materials 22 under any of a number of different formats. For example, where the contact information provides an e-mail address of the customers 32, 34 on the contact list 21, the third-party database 28 or vendor 12 may send an e-mail containing the promotional materials 22 to the customers 32, 34 on the customer list 21.

To prevent fraud, the promotional materials may be customized for each customer on the customer list 21 by the addition of indicia of authenticity (e.g., a serial number) 24 provided by the vendor 12. Where the promotional materials 22 were directly distributed to customers 32, 34 by the vendor 12 and then presented for redemption to the vendor 12, the vendor 12 may compare the indicia 24 presented for redemption with the indicia 24 in its own internal distribution list to determine authenticity. Alternatively, where a summary of the transaction is sent to the third-party database 28, the third-party database 28 may compare the indicia 24 presented for redemption with its own records to ensure that the indicia 24 was indeed distributed to the customer 32, 34 presenting the materials 22 for redemption.

In the alternative, other methods may be used to distribute the promotional materials 22. For example, where the database retains the customer list 21, a transaction processor 29 within the third-party database 28 may examine a customer identifier of each incoming purchase transaction. Where a match is found between the customer identifier of an incoming purchase transaction and an entry on the customer list 21, the third-party database 28 may download the promotional material 22 directly to a printer 16, 18 of the vendor 12, 14 for direct distribution to the customer.

Alternatively, the promotional materials 22 may downloaded to the APAC 38 at the point of sale. The customer may then scroll through and view the promotional materials as appropriate to the circumstance.

For example, where a first vendor 12 is offering the promotional materials 22 and a customer 32 makes a purchase from another vendor 14, a summary of the purchase may be sent to the third-party database 28. The third-party database 28 may compare a customer identifier from the summary of the purchase with the customer list 21. If a match is found between the customer identifier and identifiers within the customer list, the third-party database 28 may download the promotional materials 22 to the printer 18 of the vendor 14. The downloaded promotional materials 22 may be printed on the back of a sales receipt provided by the vendor 14 at the point of sale.

As a further example, a television (TV) vendor, a pizza store, and a liquor store may be unlikely to market together. The TV vendor is a mass marketer; the pizza store would likely be small and local; and the liquor store may not likely enter into an agreement with the pizza store, much less a TV vendor. In a non-limiting example, a customer of the TV vendor may be given promotional materials for the other stores while buying a new TV. Alternatively, a customer of the liquor store may be given a pizza or TV offer while buying beer. These scenarios may be possible and appropriate when the consumer is hosting a party for watching a TV program (such as a sporting event). In the past, the three merchants would not cross-promote because they didn't have the means or the information to do so. Prior art systems were unable to be highly targeted and offer real time promotional opportunities because their data was not integrated. If the TV is bought at "Best Buy" on a store charge, then it would be invisible to the credit card company. Cash purchases at the pizza store would also be left out. A check for the liquor store would similarly be left out of the loop.

In order to reach customers, vendors have used a "shot-gun" approach to market for the masses (like Superbowl ads that are shown to everyone) or highly targeted narrow promotions that fail to reach their targeted market. (Print advertising or radio ads are not read or heard by everyone who the vendor would like to reach.) By integrating data from all modes of payment using the third-party database 28, it is possible to efficiently market to a highly specific consumer at a time of purchase.

The distribution of promotional materials 22 at a point of sale may have great value in the case of transient customers. For example, the customer profile 20 may correlate the one-time check-in of a customer 32, 34 into a local hotel with distribution of promotional materials. In this way, a local eatery may notify a newcomer to the area of his establishment without the necessity of mass advertising. The promotional materials 22, as above, may be printed on the back of a receipt from the hotel or e-mailed to the customer for pick-up at his convenience at a convenient e-mail terminal (possibly provided by the hotel).

Under other illustrated embodiments, a customer 32, 34 may pay a monthly fee to the third-party database 28 to be provided with promotional materials 22 that are specific to their overall buying histories. In this case, the customer 32, 34 may provide his/her own customer profile 20 of products which that customer 32, 34 may want to receive. The customer 32, 34 may receive the promotional materials by any appropriate medium (e.g., e-mail, direct mail, point of sale print-out, etc.).

Consumers are exposed to vast amounts of unsolicited and wasteful marketing. Using the system 10 described above, it is possible for a consumer to receive, or subscribe to a service that offers, highly specific buying opportunities.

On the vendor side, there are enormous efficiencies to be gained by using the integrated data of the third-party database 28. These efficiencies translate into avoidance of advertising costs and customer savings opportunities. Small vendors can find low cost, but highly effective, opportunities that are currently beyond their reach.

Under the system 10 described above, promotions may be based upon any of a number of prior purchases (e.g., checks, cash, tokens, store charges, accumulated points plans, credit card purchases, etc.). A customer of a toll road automatic payment system (e.g., I-Pass) who uses a bridge or toll road segment, can be given restaurant or motel promotions based on his payments, location, direction, and past motel or restaurant charges. These promotions can be for commonly used items like audio tapes of books or cellular phones that operate in cellular ranges that encompass an entire itinerary. Further, 3G cellular phones may be provided in conjunction with GPS and the system 10 to provide enhanced promotions based upon geographic position.

In some cases, vendors 12, 14 may not be of equal size or magnitude of sales. In these cases, the synergy of sharing customer information may not always justify the use of the third-party database 28 or use of the third-party database 28 in the same way. For example, if one vendor 12, 14 were a very large merchandising organization (e.g., a mega-store) and a second vendor 12, 14 were a small specialty shop, then there would be no reason for the mega-store to use the third-party database 28 in the same way (if at all) because the mega-store would usually rely upon mass-advertising in any particular local area.

On the other hand, there is also no reason why both the mega-store and specialty shop could not benefit from a referral agreement. However, because of the disparity of size, the quid pro quo may not be accomplished in the same way. In these cases, the quid pro quo may be accomplished through the payment of money or other compensation for referrals. For example, if the mega-store were a grocery store and the specialty shop sold high-end grills, then referrals of customers who buy high-end grills by the specialty shop (hereinafter "the referring vendor") to the grocery store (hereinafter sometimes "the referral receiving vendor") would allow the grocery store to target advertisements involving high-profit-margin grillable foods to the referred customers. In exchange, the grocery store would make a referral payment to the specialty store for each customer referral.

It may be noted in this regard that, in general, traditional and Internet businesses can benefit from referrals. However, at present, there is no method or apparatus that connects business-to-business (B2B) arrangements with the consumer and also handles B2B payments for referrals. Moreover, current methods that attempt to accomplish referrals are cumbersome, inefficient and/or do not preserve customer privacy.

According to a first example involving the grocery store and high-end grill specialty store, the grocery store and specialty store may enter into a referral agreement where each customer referred by the specialty store may require payment of a referral fee by the grocery store. The referral fee could be a flat fee or may be based upon the volume and dollar value of grillable foods purchased by the referred customer through the grocery store. The referral agreement may include provisions that require a third party to audit the records of the grocery store for compliance with the referral agreement.

Under the first example, the specialty store may issue a discount card 42 when the customer makes a purchase of a product covered by the referral agreement (e.g., a high-end grill). The specialty store may collect contact information (e.g., name, address, etc.) through the use of a warranty registration card that is provided along with the product and that is filled out and mailed back to the specialty store by the customer 32, 34 to register under the warranty. The specialty store may save details of the transaction in a confidential file maintained by the specialty store for audit and tax purposes. If a credit card was used by the customer in the purchase of a grill, then the credit card number may be included within the file. If the purchase was a cash purchase, then the day of the transaction, the item identifier and cost of the item may be included within the file.

In addition to saving the details of the purchase for its own internal purposes, the specialty store may also generate a unique customer identifier 45 that associates the customer with the purchase of the specialty item (i.e., the high-end grill). The unique customer identifier may have an identifying characteristic (e.g., prefix) that associates the unique customer identifier with a particular referral agreement in those cases where a referring vendor 12, 14 has a number of different referral agreements with referral receiving vendors 12, 14.

The unique customer number may be imprinted on the discount card along with an identifier of the specialty store, an identifier of the referral agreement, a visual indication of the identity of the grocery store and the fact that the card is a discount card. The specialty store may also forward a list of uniquely generated customer numbers, including the unique customer number associated with the customer that bought the high-end grill, to the grocery store.

If the customer has given explicit permission, then the specialty store may release contact information (e.g., in summary form only) of the customer to the grocery store. The contact information may include a contact address through which the grocery store may send promotional materials regarding the subject matter of the referral agreement (e.g., grillable foods). The promotional materials of the grocery store may incorporate the customer identifier assigned to the customer by the specialty store.

When the customer is making a purchase from the grocery store, the customer 32, 34 may simply provide the uniquely-generated customer number to the grocery store. The grocery store may receive the customer number by the cashier or the customer entering the customer number into a computer using an input device (e.g., keyboard), the customer presenting promotional materials from the grocery store to be scanned or imaged, or the customer presenting the discount card from the specialty store to be scanned or imaged. In a non-limiting example, the cashier may enter the customer number into a computer of the grocery store, such as a point of sale terminal. Alternatively, a scanner at the point of sale terminal may read the promotional materials or discount card 42. The computer of the grocery store may save the unique customer number and details of the purchase into a transaction file 44 maintained within a database of the grocery store. In another non-limiting example, the purchase may be made entirely online via the Internet 26, such that a cashier of the vendor (e.g., grocery store) is not involved. For example, the customer may provide the customer number to the grocery store at the point of sale by inputting the number into the customer's computer using the keyboard, voice commands, or the like. The customer may also present the customer number by scanning or imaging the promotional materials and/or the discount card. Furthermore, the customer may present the customer number by selecting a link, copying and pasting, and/or dragging and dropping a virtual representation of the promotional material on a graphical user interface.

The computer of the grocery store compares the received customer identifier to the list of uniquely-generated customer numbers received, directly or indirectly, from the specialty store. If the customer identifier matches with one of the customer identifiers in the list, the computer of the grocery store validates the presented customer identifier and discounts the purchased items of the customer in accordance with a designated promotional discount rate.

Periodically, the grocery store 32, 34 may activate a software tracking program 46 (provided by either the grocery store or specialty store) that collects sales information regarding sales made under the referral agreement. The tracking program may generate a series of entries that include an identifier of the specialty store 12, 14, the unique identifier of the customer 32, 34, a dollar value of each item and the total dollar value of the items covered under the referral agreement. The software program may then calculate a dollar value of referral payments due to the specialty store. The grocery store may then remit payment to the specialty store. Periodically, a third-party agent of the specialty store may audit the files 44 of the grocery store.

According to another preferred embodiment, the third-party database 28 may administer referral agreements. In this case, the referring vendor 12, 14 may accept payment in any appropriate manner (e.g., cash, credit card, APAC 38, etc.). The referring vendor 12, 14 may assign a unique customer identifier to the transaction and also may give a discount card to the customer 32, 34. Alternatively, the referring vendor 12, 14 may save the customer identifier on the APAC 38. Once the transaction is complete, the referring vendor 12, 14 may forward details of the transaction (e.g., vendor identifier, referral agreement identifier, item identifier, unique customer identifier, customer contact information etc.) to the third-party database 28. The third-party database 28 may open a referral file for the transaction including the identifiers of both the referring vendor and vendor receiving the referral as well as the details of the transaction. In this example, the third-party database 28 may have contact information for the referred customer and the unique customer identifier associated with the referred customer without knowing the identity (e.g., name) of the referred customer.

The third-party database 28 may forward the unique customer identifier to the vendor 12, 14 receiving the referral (e.g., referral receiving vendor). For example, the unique customer numbers from multiple transactions may be aggregated into a list that is communicated to the referral receiving vendor. The referral receiving vendor may forward promotional materials to the third-party database 28. The promotional materials may incorporate the unique customer identifier. The third-party database 28 may use the contact information to forward the promotional materials to the referred customer 32, 34. Alternatively, the third-party database 28 may forward the contact information to the referral receiving vendor 12, 14 and that vendor 12, 14 may forward the promotional material directly to the customer 32, 34.

The customer 32, 34 may make purchases from the referral receiving vendor 12, 14 by paying for any purchases in any appropriate manner (e.g., cash, check, APAC 38, or credit card). If the customer 32, 34 has been given a discount card or promotional materials, then the customer 32, 34 may present the discount card and/or promotional materials at the point of sale. Alternatively, the customer 32, 34 may simply give a cashier the unique customer identifier. As described above, the computer at the referral receiving vendor may obtain the unique customer identifier from the customer (e.g., via the customer directly or via the promotional material or discount card) at the point of sale, and may compare the unique customer number to the list of customer numbers received from the third-party database 28 to determine if the presented customer identifier is valid. If the customer number matches one of the numbers in the list, the presented customer number is validated and the purchase is discounted according to a designated discount rate.

The referral receiving vendor 12, 14 may compose a summary of the transaction including the unique customer identifier and send the summary to the third-party database 28. The summary may include a list of purchased items, the cost of each item and the total cost. The third-party database 28 may receive the summary from the referral receiving vendor 12, 14 and save the summary in a database of the third-party database 28.

Periodically, the third-party database 28 may activate a software program 48, that matches purchases from referral receiving vendors 12, 14 with referring vendors 12, 14. The software program 48 may identify transactions related to referrals by matching the unique customer identifier issued by the referring vendor with the unique customer identifier contained within at least some of the transaction files. In each case, the software 48 may calculate the total volume of sales of the referred customers. From the total volume of sales, the software program 48 may calculate a dollar value due to each referring vendor 12, 14 from each referral receiving vendor 12, 14. Once a referral payment is calculated the software program 48 may generate an invoice of monies due from each referral receiving vendor 12, 14 and forward the invoice to the referral receiving vendor 12, 14. Once payment is received, the third-party database 28 may transfer the appropriate payment to the referring vendor 12, 14.

Under another preferred embodiment, the referring vendor 12, 14 may make a full disclosure of any customer information to the third-party database 28. Under this embodiment, it is the obligation of the third-party database 28 to maintain customer confidentiality.

In this case, the referring vendor 12, 14 may accept payment for purchases in any appropriate manner (e.g., cash, credit card, APAC 38, etc.). The referring vendor 12, 14 may assign a unique customer identifier to the transaction, as above, and also may give a discount card to the customer 32, 34. Alternatively, the referring vendor 12, 14 may save the customer identifier on the APAC 38. Once the transaction is complete, the referring vendor 12, 14 may forward details of a transaction (e.g., vendor identifier, referral agreement identifier, item identifier, unique customer identifier, customer name and address, etc.) to the third-party database 28. The third-party database 28 may open a referral file for the transaction including the identifiers of both the referring vendor and vendor receiving referrals as well as the details of the transaction. The transaction details may include a unique customer identifier assigned by the referring vendor 12, 14 and a credit card number if payment was made by a credit card.

The third-party database 28 may forward a list of unique customer numbers to the referral receiving vendor 12, 14. The third-party database 28 may also receive and forward promotional materials from the referral receiving vendor 12, 14 to the referred customers 32, 34. The forwarded promotional materials may each include the respective unique customer identifier.

The customer 32, 34 may make purchases from the referral receiving vendor by paying for any purchases in any appropriate manner (e.g., cash, check, APAC 38 or credit card number). If the customer 32, 34 has been given a discount card or promotional materials, then the customer 32, 34 may present the card or promotional materials at the point of sale and receive a discount.

The vendor 12, 14 may compose a summary of the transaction and send the summary to the third-party database 28. The summary may include a list of purchased items, the cost of each item and the total cost. Also included within the summary may be any identifying information such as a credit card number, customer identifier assigned by the referring vendor 12, 14, etc. The third-party database 28 may receive the summary from the vendor 12, 14 receiving the referral and save the summary in a database of the third-party database 28.

Periodically, the third-party database 28 may activate a software program 48 that matches purchases from referral receiving vendors with referring vendors. The software program 48 may identify transactions related to referrals in any of a number of different ways. Under one embodiment, the software program 48 may match the unique customer number assigned by the referring vendor with purchase transactions containing the same unique customer identifier at the referral receiving vendor. Alternatively, the software program 48 may match purchase transactions with referrals based upon a name of the customer, a credit card number used for the transaction or any other identifying characteristic such as address. In each case, the software 48 may calculate the total volume of sales of the referred customers. From the total volume of sales, the software program 48 may calculate a dollar value due to each referring vendor 12, 14 from each vendor 12, 14 receiving vendors. Once a referral payment is calculated, the software program 48 may generate and forward an invoice of monies due from each referral-receiving vendor 12, 14. Once payment is received, the third-party database 28 may transfer the appropriate payment to the referring vendor 12, 14.

In at least one embodiment, transaction details relating to purchases made by a customer at vendors is collected and moderated by a gateway system 50 utilized by the customer. The gateway system 50 may be a third-party application utilized by the customer to provide selective communication of transaction details for the purpose of receiving promotional information. For example, the gateway system 50 may include one or more processors located remote from the vendors 12, 14 and the third-party database 28. The one or more processors of the gateway system 50 may be located on a remote server or computing device that is communicatively connected to a user computing device of the customer, such as a computer, mobile phone, tablet computer, or the like. In a non-limiting example, the gateway system 50 is accessible via a mobile application and/or a website. For example, the customer may utilize the gateway system 50 by downloading an application (e.g., an app) on a mobile device.

The gateway system 50 allows the customer to control what transaction information is communicated to third parties, such as other vendors and suppliers, and to which third parties the transaction information is communicated. For example, the customer may access the gateway system 50 via a computing device (e.g., a personal computer, tablet, mobile phone, etc.) and may interact with a user interface of the gateway system 50 to set user preferences. The user preferences indicate to which third parties the gateway system 50 is configured to communicate purchase and transaction details of the customer, which types of purchase and transaction details are to be released to the third parties, and the like. For example, the gateway system 50 may provide a menu that lists various types of items, various types of vendors, specific items, specific vendors, and/or the like. The customer may select from the menu which categories of data are allowed to be shared with third parties. The gateway system 50 provides an "opt in" approach that requires the customer to explicitly select the data that the customer would like to share before any purchase information is shared.

In an embodiment, the gateway system 50 has access to details from plural transactions related to purchases made by the customer over time. In a non-limiting example, the gateway system 50 may have access to an email account of the customer and may receive transaction details within receipts that are emailed to the email account. For example, the gateway system 50 may filter emails in the account to identify and store receipts and other purchase information. Alternatively, the gateway system 50 does not have access to the email account of the customer, but the gateway system 50 may receive emails selected the customer. For example, the customer may identify a subset of emails including receipts and the like to forward to the gateway system 50. The gateway system 50 analyzes the received transaction details to categorize the transactions based on the vendor, the type of item purchased, and the like.

The gateway system 50 may utilize user-selected preferences to filter the transaction details and determine which transaction details are permitted for communication to other parties, such as to the third-party database 28 and/or directly to a referral receiving vendor. For example, if the user-selected preferences of the customer indicate that the customer would like to receive promotional materials from a grocery store, then the gateway system 50 analyzes the transaction details for purchases that are relevant to the grocery store. The gateway system 50 may determine that the purchase of the high-end grill from the referring vendor specialty store is related to the grocery store due to a known referral agreement.

The gateway system 50 may filter the transaction details to compile a list of permitted transaction details to remotely communicate. In the example above, after determining that the transaction details regarding the purchase of the high-end grill is permitted to be communicated, the gateway system 50 may communicate details regarding the purchase of the high-end grill to the third-party database and/or directly to the referral receiving vendor (e.g., the grocery store). The transaction details that are communicated include any unique customer numbers generated by the referring vendors. In response to receiving the transaction details, the third-party database and/or the referral receiving vendor may distribute promotional material to the customer, as described above.

In a non-limiting example, if the gateway system 50 receives a permitted transaction detail representing a receipt for an airplane ticket to a specific city, the gateway system 50 may access a look-up table to determine which vendors in the specific city have a referral agreement in place with the airline. The gateway system 50 could then forward the transaction details about the flight to the third-party database and/or one or more referral receiving vendors in that city in order to distribute promotional material of the one or more referral receiving vendors in that city to the customer. The customer is then able to utilize the promotional material during the trip. The promotional material is distributed to the customer to provide suggestions and/or recommendations for referral receiving vendors that the customer could visit while on the trip, such as hotels, restaurants, shows, and the like.

Optionally, the gateway system 50 may aggregate and communicate permitted transaction details from purchases made by multiple different customers. For example, the gateway system 50 may collect permitted transaction details from multiple customers that purchase goods at a specific referring vendor. The gateway system 50 may communicate the aggregated list of transaction details associated with the referring vendor to a referral receiving vendor that is in a referral agreement with the referring vendor. Optionally, the referral receiving vendor may represent a supplier that supplies goods to the referring vendor. The supplier can use the received transaction details for tracking new products, sales trends, and/or the like over time. The supplier and/or third-party database can tailor promotional materials of the supplier that is distributed to customers based on the information revealed from the received transaction details.

In an embodiment, the gateway system 50 may be configured to analyze the aggregated permitted transaction details from the purchases made by multiple different customers. The gateway system 50 can track purchase trends of customers within designated time periods, geographic locations, and/or the like, based on the permitted transaction details received. In the example above regarding the purchase of an airplane ticket to a specific city, the gateway system 50 may analyze the aggregated permitted transaction details of other customers who have flown to that city for determining purchase trends by these customers in that city. The gateway system 50 may utilize the purchase trends (from the historical purchase information of a group of customers) to determine which referral receiving vendors to communicate the transaction details regarding the airplane ticket, to provide recommendations to the customer of vendors to visit in that city, and/or the like.

The gateway system 50 is used to control the transaction information of the customer that is communicated remotely to other vendors and/or the third-party database 28. For example, in the embodiments described above, the referring vendor (e.g., the specialty store) communicates the transaction information of the customer, including a list of unique customer identifiers, to the referral receiving vendor and/or the third-party database 28. In this embodiment, the referring vendor may keep records of transactions, but does not remotely communicate the transaction details to other vendors or third parties. Rather, the customer uses the gateway system 50 to selectively control the dissemination of purchase information to third parties, including other vendors. The gateway system 50 may enhance user privacy by enabling the customer to select which transaction information is disseminated for the purpose of receiving promotional materials. The gateway system 50 allows the customer more control over the access and use of purchase information in order to get benefits from the purchases in an automated way.

In another illustrated embodiment, large department stores (e.g., Target, Wal-Mart, etc.) have many items on their shelves, but target only the middle of any consumer demand distribution curve (i.e., they cater to the most common parts of consumer demand and ignore the extremes). For example, they sell clothes in the most popular sizes and styles. Other, smaller merchants in the area may have specialty stores that carry a narrow/specialized selection of goods, but in depth and in many sizes. In a consumer-based model, it would be beneficial for these retailers to refer to one another when appropriate. Currently, other than from a salesperson's suggestion or a coupon/brochure distribution, there is no efficient way to do this. What is proposed is an efficient way to track these referrals and/or to pay a finder or referral fee.

In another illustrated embodiment, a vendor (e.g., a hotel) commonly generates referrals to many other vendors (enterprises). For example, referrals may be sent from the hotel to taxis, restaurants, sports events, conventions and cultural events. The contracting and tracking of these activities are inconsistent, inefficient and ineffective. There is no standardized or centralized means of handling these activities. Travel companies such as Travelocity, Expedia, and others provide a centralized means of linking related activities, but they do so in a different manner. They use information from online reservations, not from information generated from a point of sale.

The vendors 12, 14 may have a two-way referral agreement in which referrals are handled on an individual basis. That is, a referring vendor would receive a referral fee for each referral. At the end of the time period, the referrals would be compared and for any two vendors, the vendor providing more referrals would receive payment for the difference in total referral fees.

In this case, the referring vendor 12, 14 (either the large store or small store) may give a referral coupon to a customer 32, 34 when a referral is made. The referral coupon contains a name and address of the referral receiving vendor 12, 14. As above, the referral coupon may contain a unique customer identifier. The referral receiving vendor 12, 14 accepts the referral coupon and, if a sale to the customer is made, the referral receiving vendor 12, 14 makes a payment to the referring vendor 12, 14 as described in more detail above.

A specific embodiment of a method and apparatus for providing promotional materials has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The foregoing description of certain embodiments of the inventive subject matter will be understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general-purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that incorporate the recited features. Moreover, unless explicitly stated to the contrary, embodiments "comprising," "including," or "having" an element or a plurality of elements having a particular property may include additional such elements not having that property. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112 (f), unless and until such claim limitations expressly use the phrase "means for" followed by a statement of function void of further structure.

What is claimed is:

1. A system comprising:
   one or more processors; and
   a computer of a referral receiving vendor,
   wherein the one or more processors are configured to:
     receive a unique customer identifier that is generated by a computer of a referring vendor, wherein the unique customer identifier associates a customer with a product purchased by the customer from the referring vendor
     distribute promotional material of the referral receiving vendor to the customer that is associated with the unique customer identifier, wherein the promotional material of the referral receiving vendor incorporates the unique customer identifier generated by the computer of the referring vendor, and
     communicate a list of plural unique customer identifiers associated with different customers of the referring vendor to the computer of the referral receiving vendor,
   wherein the computer of the referral receiving vendor is configured to:
     receive one or both of the promotional material or the unique customer identifier from the customer at a point of sale while the customer purchases one or more items affiliated with the promotional material from the referral receiving vendor,
     validate the one or both of the promotional material or the unique customer identifier received at the point of sale by matching the unique customer identifier with an entry in the list communicated from the one or more processors, and
     responsive to validating the one or both of the promotional material or the unique customer identifier, discount a purchase price of the one or more items affiliated with the promotional material at the point of sale according to a predetermined discount rate in the promotional material.

2. The system of claim 1, wherein the one or more processors are configured to distribute the promotional material of the referral receiving vendor to the customer by printing the promotional material on a sales receipt provided to the customer by the referring vendor at the point of sale while the customer purchases the product from the referring vendor.

3. The system of claim 1, wherein the one or more processors receive both the unique customer identifier and customer contact information of the customer from the computer of the referring vendor, and the one or more processors are configured to distribute the promotional material of the referral receiving vendor to the customer by sending the promotional material to the customer according to the customer contact information.

4. The system of claim 1, further comprising a gateway system remote from the computer of the referring vendor, the gateway system configured to communicate transaction details to the one or more processors, wherein the transaction details are related to the purchase by the customer from the referring vendor and include the unique customer identifier and customer contact information of the customer.

5. The system of claim 4, wherein the gateway system is configured to generate the transaction details based on a receipt issued by the referring vendor.

6. The system of claim 4, wherein the gateway system is configured to filter details of plural transactions of the customer based on user-selected preferences to compile a list of permitted transaction details to communicate, wherein the transaction details related to the purchase by the customer from the referring vendor are included in the list of permitted transaction details.

7. The system of claim 1, wherein the one or more processors are configured to select the promotional material of the referral receiving vendor that is distributed to the customer based on a type of the product purchased by the customer from the referring vendor.

8. The system of claim 1, wherein the computer of the referral receiving vendor is further configured to generate a transaction summary of the sale with the customer that is stored in a database, the transaction summary identifying the unique customer identifier, the one or more items affiliated with the promotional material that are purchased by the customer, and the purchase price of the one or more items.

9. The system of claim 8, wherein the one or more processors are configured to access the transaction summary and other transaction summaries stored in the database and aggregate sales made by the referral receiving vendor based on the transaction summary and the other transaction summaries, wherein the one or more processors are configured to calculate a referral fee that is owed to the referring vendor by the referral receiving vendor based on the aggregate sales.

10. The system of claim 9, wherein the one or more processors are configured to generate and send an invoice that includes the referral fee to the referral receiving vendor.

11. The system of claim 1, wherein the one or more processors are components of a third-party database that is located remote from both the computer of the referring vendor and the computer of the referral receiving vendor.

12. The system of claim 1, wherein the one or more processors are configured to distribute the promotional material of the referral receiving vendor to the customer by one or more of sending an email with the promotional material to an email address associated with the customer, communicating the promotional material to a printer device that prints a first physical document with the promotional material, or mailing a second physical document with the promotional material to an address associated with the customer.

13. A method comprising:
  receiving, at one or more processors, a unique customer identifier that is generated by a computer of a referring vendor, the unique customer identifier associates a customer with a product purchased by the customer from the referring vendor;
  distributing, by the one or more processors, promotional material of a referral receiving vendor to the customer that is associated with the unique customer identifier, wherein the promotional material that is distributed incorporates the unique customer identifier generated by the computer of the referring vendor;
  communicating a list of plural unique customer identifiers associated with different customers of the referring vendor to a computer of the referral receiving vendor;
  responsive to receiving, at the computer of the referral receiving vendor, the one or both of the promotional material or the unique customer identifier from the customer at a point of sale while the customer purchases one or more items affiliated with the promotional material from the referral receiving vendor, validating the one or both of the promotional material or the unique customer identifier by matching the unique customer identifier with an entry in the list; and
  responsive to validating the one or both of the promotional material or the unique customer number, discounting a purchase price of the one or more items affiliated with the promotional material at the point of sale according to a predetermined discount rate in the promotional material.

14. The method of claim 13, further comprising communicating, by a gateway system remote from the computer of the referring vendor, transaction details to the one or more processors, wherein the transaction details are related to the purchase by the customer from the referring vendor and include the unique customer identifier and customer contact information of the customer.

15. The method of claim 14, further comprising generating, by the gateway system, the transaction details based on a receipt issued by the referring vendor.

16. The method of claim 14, further comprising, filtering, by the gateway system, details of plural transactions of the customer based on user-selected preferences to compile a list of permitted transaction details to communicate, wherein the transaction details related to the purchase by the customer from the referring vendor are included in the list of permitted transaction details.

17. The method of claim 13, further comprising generating a transaction summary of the sale between the referral receiving vendor and the customer and storing the transaction summary in a database, the transaction summary identifying the unique customer identifier, the one or more items affiliated with the promotional material that are purchased by the customer, and the purchase price of the one or more items.

18. The method of claim 17, further comprising accessing, via the one or more processors, the transaction summary and other transaction summaries stored in the database and aggregating sales made by the referral receiving vendor based on the transaction summary and the other transaction summaries stored in the database, wherein the method comprises calculating, via the one or more processors, a referral fee that is owed to the referring vendor by the referral receiving vendor based on the aggregate sales.

19. A system comprising:
  a gateway system configured to filter details of plural transactions of a customer based on user-selected preferences by the customer and to compile a list of permitted transaction details to communicate, the gateway system configured to communicate at least some of the permitted transaction details in the list, wherein the permitted transaction details that are communicated include a unique customer identifier that is generated by a computer of a referring vendor, the unique customer identifier associates the customer with a product purchased by the customer from the referring vendor; and one or more processors at a third-party database configured to receive the permitted transaction details communicated by the gateway system and to distribute promotional material of a referral receiving vendor to the customer that is associated with the unique customer identifier based on the permitted transaction details, wherein the promotional material of the referral receiving vendor incorporates the unique customer identifier generated by the computer of the referring vendor, and the one or more processors at the third-party database are configured to distribute the promotional material by one or more of sending an email with the promotional material to an email address associated with the customer, communicating the promotional material to a printer device that prints a first physical document with the promotional material, or mailing a second physical document with the promotional material to an address associated with the customer.

20. The system of claim 19, wherein the gateway system is configured to filter the details of the plural transactions of the customer based on the user-selected preferences such that transaction details that are not included in the compiled list of permitted transaction details are not communicated from the gateway system.

\* \* \* \* \*